Jan. 26, 1954         H. WAGTER         2,666,955
                   DECORTICATING DEVICE
Filed Aug. 11, 1949                2 Sheets-Sheet 1

Patented Jan. 26, 1954

2,666,955

UNITED STATES PATENT OFFICE 2,666,955

DECORTICATING DEVICE

Hendrik Wagter, Broek in Waterland, Netherlands, assignor to Gebr. Stork & Co.'s Apparatenfabriek N. V., Amsterdam, Netherlands, a corporation of the Netherlands Application August 11, 1949, Serial No. 109,709

Claims priority, application Netherlands May 25, 1949

3 Claims. (Cl. 19—8)

The invention relates to an apparatus for removing the pulp from fibrous parts of plants by means of beaters moving relatively to, and co-operating with, a supporting and holding device for the parts to be decorticated, i. e. to be treated for recovering fibres from them. Ample quantities of water are used in known apparatuses which are used, in particular, in the production of sisal from agave In general, the product, i. e. the fibre, which is obtained in this manner is not of sufficient value to justify the annual manuring with artificial fertilizers of the soil on which the plant is grown. In consequence of this the soil shows signs of exhaustion after a few years, which results in a decline of the crop, both qualitatively and quantitatively.

The parts of the plants from which the fibres are obtained contain only a small percentage of fibres, usnually not more than 3%, the remainder is separated during decorticating and is lost. It has already been proposed to return to the land this waste, which, in the main, contains the nutritious substances absorbed from the soil, by using it as compound manure. In that event the use of fertilizers is warranted because a portion of the fertilizers, after being withdrawn from the soil, is returned together with the waste, so that a multiple effect of the fertilizer is attained.

In the decorticating process large quantities of water are used for drawing off the residual substances, which consist chiefly of pulp and mucous substances. Since these substances themselves are already very aqueous, the resultant waste is a completely fluid product, which can be transported only by pumping. The waste can be returned to the land in this manner in those cases where the soil is flat or terraced, e. g. by means of an irrigation system. If, however, the ground is accidented, as is usually the case in Africa, this procedure becomes too expensive.

Now the invention is based on the idea that if the waste could be obtained in a dry condition, it could be returned easily to the estate as a dry substance in chests or boxes, employing, for example, the same means of transport (rail trucks or motor trucks) by which the crops are brought to the decorticating plant.

It is possible to remove the pulp from the parts of the plants without the addition of any water, but the product thus obtained is found to be contaminated with pulp, mucous substances and the like to such a degree that the value of the product (the fibres) is reduced appreciably, if not eliminated entirely.

Now according to the invention decorticating is carried out in more than one stage, water being applied in the last stage only and the pulp removed is then withdrawn separately. Thus by far the greater part of the pulp is obtained in a dry condition and can be transported in the manner referred to above, while only a small portion is lost with the effluent water, but the resultant product has the same properties as the previously known product.

This improved process might be accomplished simply in two decorticators connected in series, the first to operate without, and the second with, water flushing. Naturally, however, this will render the total plant very expensive. In view of this, and according to the invention, a beater of a single decorticator may be in the form of a wheel, the periphery of which is provided with two or more axially spaced rings of beater ribs, water supply means being provided opposite only the last ring in the conveying direction. Thus, as hitherto, a single decorticator is sufficient, but by far the greater part of the waste pulp is obtained in relatively dry condition.

The invention will be explained in greater detail with reference to the accompanying drawings in which.

Figure 1:
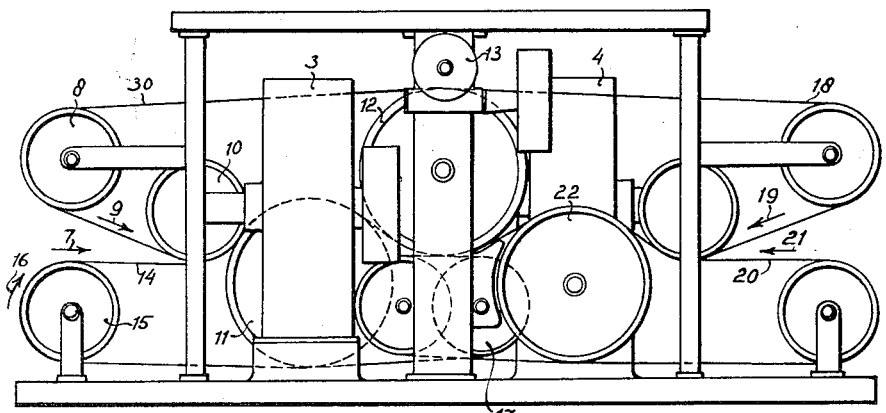
Figure 1 is a somewhat diagrammatic side view of a decorticator of the well-known type.

The apparatus shown in Figure 1, which can be driven from a driving shaft or directly by means of driving motors, has two beater drums, housed in casings 3 and 4 respectively.

The parts of plants to be treated are supplied in bundles and conveyed through the apparatus by rope systems, first one end of a part of the plant being depulped by the beater 3 and subsequently the other end by the beater 4 when the material is fed into the apparatus in the direction indicated by the arrow 7.

A double rope 30 runs from the feeding end from the pulley 8 in the direction of the arrow 9, below the pulley 10, then over the top of the grooved wheel 11 and then back round and under a wheel 12. This wheel 12 is driven by worm gearing indicated generally at 13.

A lower rope 14 runs from a pulley 15 in the direction of the arrow 16 between the two upper ropes 30, below the pulley 10, then over the wheel 11 still between the ropes 30, below the wheel 12 and then back round and under a pulley 17. It will be understood that the parts of the plants are gripped between the three ropes at the level of the bottom of the pulley 10 and are then passed through the beater 3, where one part of the plant is partially decorticated. It is to be understood that the parts of the plants extend transversely of the ropes 30 and are gripped approximately mid-way of their length.

A second rope system is arranged adjacent the one just described and comprises a double rope 18 moving in the direction of the arrow 19, as upper ropes, and a single lower rope 20 moving in the direction of the arrow 21. For these ropes a separate wheel 12 is provided, so that there are two wheels 12 one behind the other. At the intersection of the two rope systems under the wheels 12 the rope system 18, 20 takes over the parts of the plants which have been fed and depulped at one end and conveys the other end of said parts to the beater 4; thus the other half is depulped. This takes place at the moment when the parts of the plants are passing the top of the disc 22.

Figure 2:
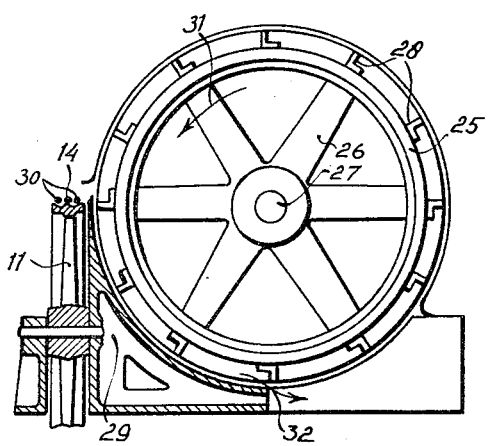
Figure 2 is a sectional view showing on a larger scale a beater drum in the apparatus illustrated by Figure 1.

As shown in Figure 2 a beater consists of a drum 25 with spokes 26, on a shaft 27, the rim of the drum 25 being provided with beater ribs 28. At the left of Figure 2 the wheel 11 (Figure 1) is shown in section. The beater drum 25 is surrounded in part by the casing 3 and cooperates with a saddle 29 which occupies part of the gap in the casing 3. The parts of the plants jammed between the ropes 30 and 14 are forced between the beater wheel and the saddle 29, since the wheel rotates in the direction of the arrow 31, the beater ribs 28 remove the pulp from the parts of the plants and the pulp is drawn off in the direction of the arrow 32.

Figure 3:
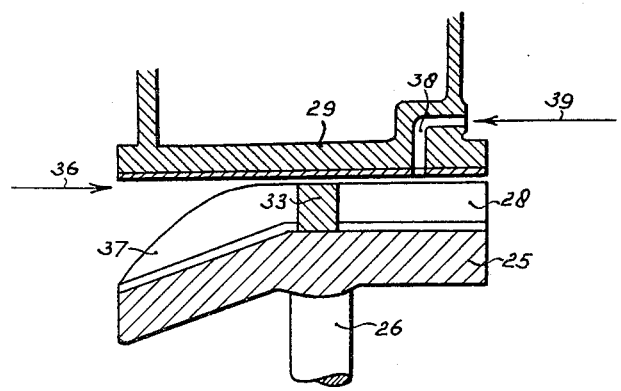
Figures 3 and 4 are fragmentary sectional details of embodiments according to the present invention.
Figure 4:
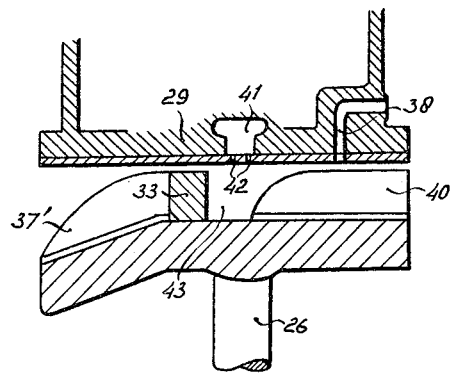

Figures 3 and 4 illustrate alternative cross-sections through the rim 25 of the beater drum and through the adjoining portion of the saddle 29. As shown in Figure 3 the beater ribs 28 are interrupted by a ring or collar 33. The parts of the plants (conveyed by the ropes 30 and 14) are fed in the direction of the arrow 36 and are first treated by slanting portions 37 of the beater ribs. This operation is effected entirely without water and removes the greater part of the pulp. When during their progress the parts of the plants have passed the collar 33, they come into contact with the straight portions of the beater ribs, opposite which water supply openings 38 are formed in the saddle 29. The water is fed in the direction of the arrow 39. Here the remainder of the pulp is removed, with the application of a plentiful supply of water, but this water does not pass the collar 33.

In the embodiment shown in Figure 4 each of the beater ribs is constructed in two pieces. The first piece 37', with a slanting entrance edge, abuts against the collar 33 and beyond this collar a separate beater rib 40 is provided, again with a slanting entrance edge. Any flushing water, fed through the opening 38, which might tend to penetrate into the first portion of the beater drum past the collar 33 is drawn off through a wide discharge pipe 41, which communicates with the surface of the saddle by way of openings 42.

What I claim is:

1. An apparatus for decorticating fibrous parts of plants comprising conveying means for holding and conveying said parts of plants, beating stations located at either side of the said conveying means, said beating stations each comprising a rotatable drum carrying beaters on its outer surface, stationary supporting means presenting a concave face adjacent said outer surface of each of said drums as a support for the parts of plants passing said beating station to be decorticated while said parts are conveyed by the said conveying means, said beaters being arranged in axially spaced annular sets on the drum, means for supplying water in the space between the said concave support face and the drum opposite the annular set of beaters which is the last one on the drum in the conveying direction, and the annular sets of beaters being separated by collars on the drum fitting close to the concave supporting face.

2. An apparatus for decorticating fibrous parts of plants comprising conveying means for holding and conveying said parts of plants, a plurality of beating stations disposed at either side of the said conveying means, supporting means opposite each of the said beating stations adapted to support the parts of plants passing said beating stations to be decorticated while said parts are conveyed by the said conveying means, each of said beating stations comprising a rotatable drum having its axis of rotation in the conveying direction and carrying a plurality of beaters disposed in annular rows on the outer surface of said drum, means for supplying water into the space between the last of said rows of beaters in the conveying direction and the support associated with the latter.

3. An apparatus for decorticating fibrous parts of plants comprising conveying means for holding and conveying said parts of plants, a beating station being located at each side of the said conveying means, supporting means opposite each of said beating stations presenting a support for the parts of plants passing said beating station to be decorticated while they are conveyed by the said conveying means, each of said beating stations comprising a rotatable drum having its axis of rotation in the conveying direction and carrying a plurality of axially spaced annular rows of beaters on its outer surface, means for supplying water into the space between the last of said rows of beaters in conveying direction and the support associated with the latter, the annular rows of beaters on the drum being separated by collars in the drum fitting close to the support associated therewith.

HENDRIK WAGTER.

References Cited in the file of this patent

UNITED STATES PATENTS

| Number | Name | Date |
|---|---|---|
| 328,357 | Stephens | Oct. 13, 1885 |
| 1,017,104 | Lavedan et al. | Feb. 13, 1912 |
| 1,258,571 | Humphreys | Mar. 5, 1918 |

FOREIGN PATENTS

| Number | Country | Date |
|---|---|---|
| 437,100 | Great Britain | Feb. 23, 1935 |
| 483,216 | Great Britain | Apr. 13, 1938 |